United States Patent
Aschpurwis

(10) Patent No.: US 10,207,295 B2
(45) Date of Patent: Feb. 19, 2019

(54) SORTING DEVICE AND METHOD FOR SORTING BULK MATERIAL

(71) Applicant: SIEMENS AKTIENGESELLSCHAFT, Munich (DE)

(72) Inventor: Carsten Aschpurwis, Constance (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/544,064

(22) PCT Filed: Aug. 12, 2015

(86) PCT No.: PCT/EP2015/068523
§ 371 (c)(1),
(2) Date: Jul. 17, 2017

(87) PCT Pub. No.: WO2016/113002
PCT Pub. Date: Jul. 21, 2016

(65) Prior Publication Data
US 2017/0361356 A1    Dec. 21, 2017

(30) Foreign Application Priority Data

Jan. 16, 2015 (DE) ......................... 10 2015 200 618

(51) Int. Cl.
| | |
|---|---|
| B07C 3/02 | (2006.01) |
| B07C 3/08 | (2006.01) |
| B65G 47/46 | (2006.01) |
| B65G 47/68 | (2006.01) |

(52) U.S. Cl.
CPC .................. *B07C 3/08* (2013.01); *B07C 3/02* (2013.01); *B65G 47/46* (2013.01); *B65G 47/68* (2013.01)

(58) Field of Classification Search
CPC  B07C 3/08; B07C 3/082; B07C 3/085; B07C 3/087; B65G 47/68; B65G 47/682; B65G 47/683; B65G 47/684; B65G 47/46
See application file for complete search history.

(56) References Cited

U.S. PATENT DOCUMENTS

| | | | |
|---|---|---|---|
| 3,198,351 A | 8/1965 | Paglee | |
| 5,353,912 A * | 10/1994 | Killer | B07C 3/082 198/370.04 |
| 8,061,506 B2 | 11/2011 | Schäfer | |
| 8,374,720 B2 | 2/2013 | Kechel | |

(Continued)

FOREIGN PATENT DOCUMENTS

| | | |
|---|---|---|
| CH | 495874 | 10/1970 |
| CN | 1288399 A | 3/2001 |

(Continued)

*Primary Examiner* — Mark A Deuble
(74) *Attorney, Agent, or Firm* — Laurence Greenberg; Werner Stemer; Ralph Locher

(57) ABSTRACT

A sorting device and a method for sorting bulk material. In order to be able to load a sorting facility of the sorting device with just one feeding facility with bulk material such that the sorting facility can be operated with a high throughput, provision is made for the sorting facility and the feeding facility to be arranged so as to run in parallel with one another in a transfer area. In the transfer area, bulk material is transferred from the feeding facility to the sorting facility.

4 Claims, 2 Drawing Sheets

(56) References Cited

U.S. PATENT DOCUMENTS

| | | | |
|---|---|---|---|
| 2002/0017537 A1 | 2/2002 | Barklin et al. | |
| 2005/0056572 A1 | 3/2005 | Wilke | |
| 2010/0300836 A1 | 12/2010 | Fourney et al. | |
| 2011/0192770 A1 | 8/2011 | Goertz et al. | |
| 2014/0110312 A1 | 4/2014 | Allen et al. | |
| 2015/0217334 A1* | 8/2015 | Kim | B07C 3/02 |
| | | | 209/552 |
| 2016/0340129 A1* | 11/2016 | Beesley | B65G 15/12 |
| 2016/0355349 A1* | 12/2016 | Chierego | B65G 23/36 |

FOREIGN PATENT DOCUMENTS

| | | |
|---|---|---|
| CN | 203044353 U | 7/2013 |
| DE | 4221464 A1 | 1/1994 |
| DE | 10340752 A1 | 3/2005 |
| DE | 10342804 B3 | 4/2005 |
| DE | 102004035365 A1 | 2/2006 |
| DE | 102004048515 A1 | 4/2006 |
| EP | 1645340 A1 | 4/2006 |
| WO | 0032502 | 6/2000 |
| WO | 0032502 A9 | 4/2001 |
| WO | 2009024298 A1 | 2/2009 |
| WO | 2014146943 A1 | 9/2014 |

\* cited by examiner

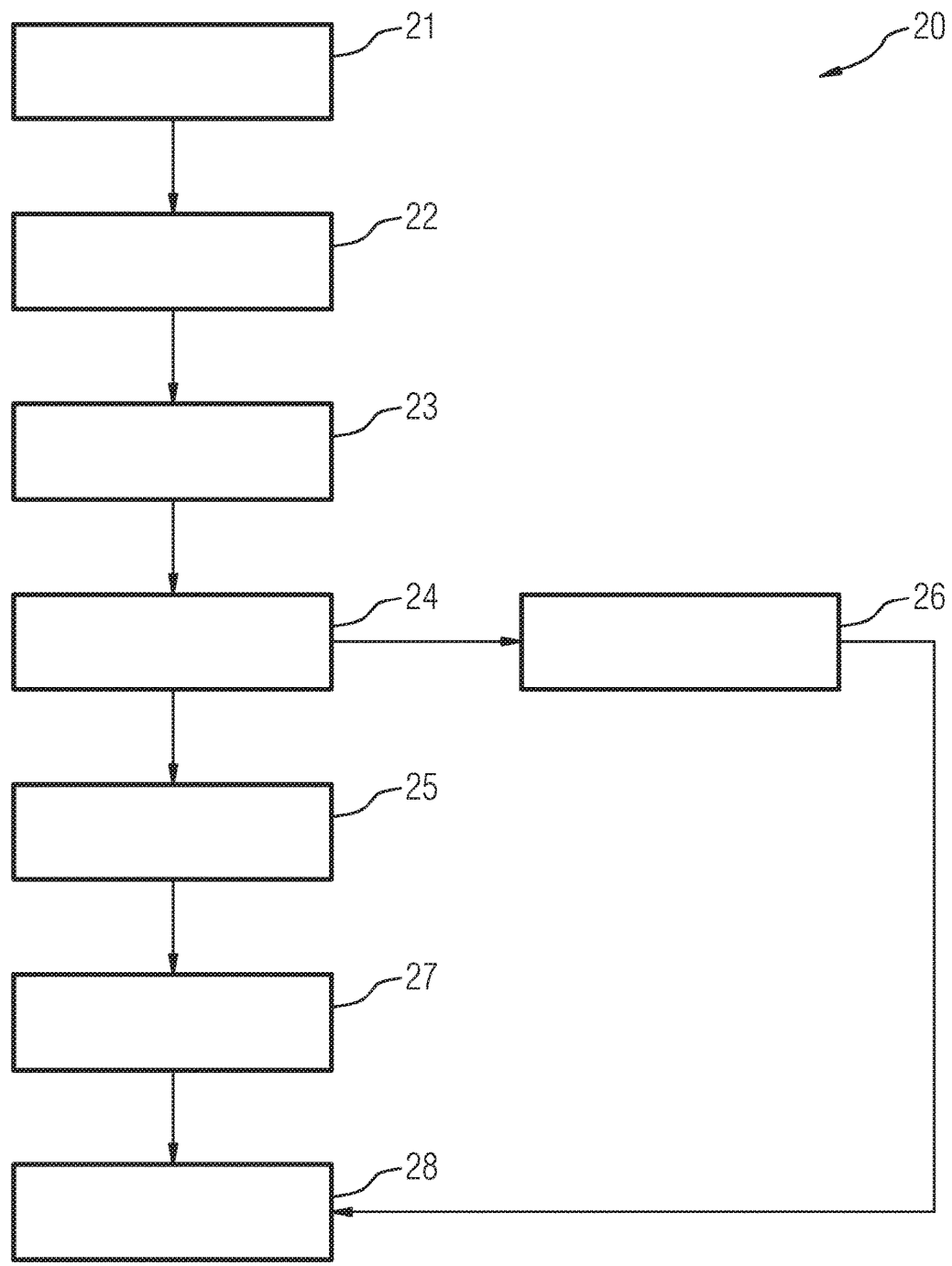

SORTING DEVICE AND METHOD FOR SORTING BULK MATERIAL

BACKGROUND OF THE INVENTION

Field of the Invention

The invention relates to a sorting device for sorting bulk material, having a sorting facility which transports bulk material to a number of sorting destinations during operation, and having a feeding facility which feeds bulk material to the sorting facility during operation and transfers the same in a transfer area. Furthermore, the invention relates to a method for sorting bulk material with a sorting device having a sorting facility and a feeding facility, in which bulk material is fed with the feeding facility to the sorting facility and is transferred in a transfer area.

Sorting devices and methods for sorting bulk material are generally known. To be able to set up the feeding facility in a simple manner, known feeding facilities are only able to move the bulk material to be fed to the sorting facility in a linear manner in a feed direction. In order to be able to transfer the bulk material, the feed direction in the transfer area runs obliquely to the sorting facility. On account of the oblique infeed of the bulk material to the sorting facility, it may however occur that not all transport positions of the sorting facility can be loaded with bulk material by means of the feeding facility. In order to be able to operate the sorting facility efficiently, a number of feeding facilities are therefore to be provided. However, the number of feeding facilities not only increases equipment costs. Instead, a number of feeding facilities also requires considerable space, which is no longer available for other machines and for instance other sorting devices. A sorting device of this type is disclosed in WO 00/32502 for instance.

By way of example bulk material to be sorted may be shipping goods, for instance letters, packages and/or parcels. The sorting destination may therefore be delivery destinations, for instance other postal centers or delivery addresses. The sorting device has thirty three delivery destinations for instance, into which the bulk material is to be sorted. In such cases a sorting destination may have a number of delivery addresses. Furthermore, the sorting device can also sort other bulk material, for instance bulk material which is to be removed from a warehouse and is to be delivered to a recipient.

SUMMARY OF THE INVENTION

The object therefore consists in providing a sorting device and a method for sorting bulk material, wherein the bulk material can be sorted with minimal space requirements for the sorting device.

In accordance with the invention a sorting device of the type cited in the introduction is made available, wherein the sorting facility and the feeding facility are arranged so as to run in parallel with one another in the transfer area. Furthermore, a method of the type cited in the introduction is made available, wherein the bulk material in the transfer area is moved in parallel with the sorting facility.

By means of the parallel arrangement of the sorting facility and the feeding facility in the transfer area and the parallel feeding of the bulk material to the sorting facility, the sorting device requires less space compared with known sorting devices. In particular, the space required is reduced as a result so that the feeding facility in the transfer area does not extend away from the sorting facility, but instead runs in parallel herewith at least in sections.

The inventive solution can be improved further for various embodiments, which are in each case advantageous per se and, unless detailed otherwise, can be combined arbitrarily with one another. These embodiments and the advantages associated with them will now be considered.

Therefore the feeding facility can have at least one transfer facility, with which bulk material can be moved at right angles to the course of the feeding facility in the transfer area. The transfer facility is a transverse belt conveyor for instance and is embodied to move the bulk material at right angles to a feed direction, in which the bulk material can be fed to the transfer area. Alternatively, the transfer facility may be a shoe sorter for instance, with which the bulk material can be slid at right angles to the course of the feeding facility. Furthermore, the transfer facility can be tilted at least in sections and have a plate which can be lifted on one side for instance, by which due to gravity the bulk material slips downward in the tilted or lifted state. Consequently with a feeding facility which runs in parallel with the sorting facility and which moves the bulk material in parallel with the sorting facility, bulk material can be transferred to the sorting facility at right angles to the feed direction.

A feed speed at which the feeding facility feeds bulk material to the sorting device can be controlled independently of a transfer speed at which bulk material is transferred from the feeding facility and in particular from the transfer facility to the sorting facility. As a result of the feed speed and transfer speed being controllable independently of one another, bulk material can be fed and transferred so rapidly that all transport positions of the sorting facility can be occupied. In such cases the transfer speed is only determined by the length of the transfer area in the direction of the feed speed. Consequently the sorting efficiency of the sorting device is increased compared with known sorting devices, since a higher throughput and in particular the maximum possible throughput of the transfer facility and/or of the sorting facility is achieved with little effort.

The sorting device may have a control facility, with which the feed speed of the feeding facility in parallel with the direction of movement of the sorting facility in the transfer area can be controlled as a function of a speed of movement of the sorting facility. The feed speed can therefore be easily adjusted to the speed of movement, without influencing the transfer speed if the transfer area is long enough.

In order to be able to position individual bulk materials in relation to transport positions of the sorting facility, the feeding facility can have at least one acceleration facility for positioning bulk material to be transferred. The acceleration facility can be used to adjust the feed speed of bulk material in order to be able to correct the position of the bulk material, with an offset in the feed direction in relation to the predetermined transport position, to the sorting facility.

The acceleration facility may have a number of acceleration segments or sections, which are embodied to adjust the position of a number of bulk materials to the sorting facility independently of one another. Therefore, the bulk materials can be prepositioned independently of one another and substantially simultaneously also then with respect to the respective predetermined transport position if the offset of the bulk materials varies in relation to the respective predetermined transport position. The acceleration segments are preferably arranged downstream of one another in the feed direction and can be controlled as a function of one another.

The control device is therefore preferably embodied to vary the feed speed in order to position bulk material to be transferred at the predetermined transport position. If the sorting device has a number of acceleration segments, then the control device is preferably embodied to actuate the acceleration segments independently of one another and thus to accelerate bulk material located on the respective acceleration segment independently of bulk material present on another of the acceleration segments.

The transfer facility is preferably arranged downstream of the acceleration facility in order to be able firstly to position the bulk material and then to transfer the positioned bulk material.

The sorting device can also have a transport facility arranged upstream of the transfer facility and/or the acceleration facility, for instance a belt conveyor, on which the bulk material to be sorted is placed and with which the bulk material is transported in the direction of the transfer area.

It may occur however that one of the bulk materials may not be prepositioned sufficiently accurately or for other reasons is not to be transferred to the sorting facility. With known sorting devices the feeding facility is then to come to a stop and where possible even to operate in a direction which is counter to the feed direction in order to be able to remove non-transferable bulk material from the feeding facility. In order to be able to remove non-transferable bulk material without the feeding device coming to a stop, the sorting facility can have an unloading facility for receiving bulk material not transferred with the feeding facility to the sorting facility, wherein the unloading facility is arranged adjacent to or behind the transfer area. The unloading facility can be arranged adjacent to or behind the transfer area particularly when viewed from the acceleration facility, the transport facility and/or in the feed direction. Consequently the bulk material does not need to be moved counter to the feed direction, since in the feed direction the unloading device is arranged behind the acceleration facility.

For instance, the feeding facility is arranged at least in sections between the sorting facility and the unloading facility. In particular, the transfer facility of the feeding facility can be arranged between the sorting facility and the unloading facility. With a transfer facility arranged in this way, it is sufficient if the transfer facility does not transport the non-transferable bulk material in the transfer direction in the direction of the sorting facility, but instead in an unloading direction which runs counter to the transfer direction away from the sorting facility and toward the unloading facility. A function of this type can easily be made available with a transverse belt conveyor for instance.

Bulk material which cannot be transferred to the sorting device can therefore be easily discharged behind or adjacent to the transfer area in the direction of movement, as a result of which the sorting throughput of the sorting device is not or only marginally reduced by non-transferable bulk material without the feeding facility coming to a stop for this purpose or even operating backward.

The transfer facility can have at least one transfer segment which in the transfer area moves with the transport speed of the sorting facility and in parallel with the sorting facility. The at least one transfer segment is therefore positioned in relation to one of the transport positions of the sorting facility along the speed of movement of the sorting facility and retains this position at least in the transfer area.

If the transfer facility has a number of transfer segments, then the transfer facility can receive a number of bulk materials and transfer the same consecutively or simultaneously to the sorting facility and/or the unloading facility. The throughput of the transfer facility is hereby increased by comparison with the transfer facility with just one transfer segment.

The individual transfer segments can be actuated separately from one another, for instance with the help of the control facility. In particular, the direction in which selected or all of the transfer segments transfer bulk material to the sorting facility and/or to the unloading facility can be controlled independently so that one of the transfer segments transfers a bulk material which cannot be transferred to the sorting facility to the unloading facility and another transfer segment transfers another bulk material to the sorting facility.

The above-described properties, features and advantages of this invention and the manner in which these are achieved will now be described more clearly and explicitly in conjunction with the following description of the exemplary embodiments, which are explained in greater detail in conjunction with the drawings, in which:

BRIEF DESCRIPTION OF THE SEVERAL VIEWS OF THE DRAWING

FIG. 2 shows an exemplary embodiment of an inventive method for sorting bulk material.

DESCRIPTION OF THE INVENTION

Figure 1:
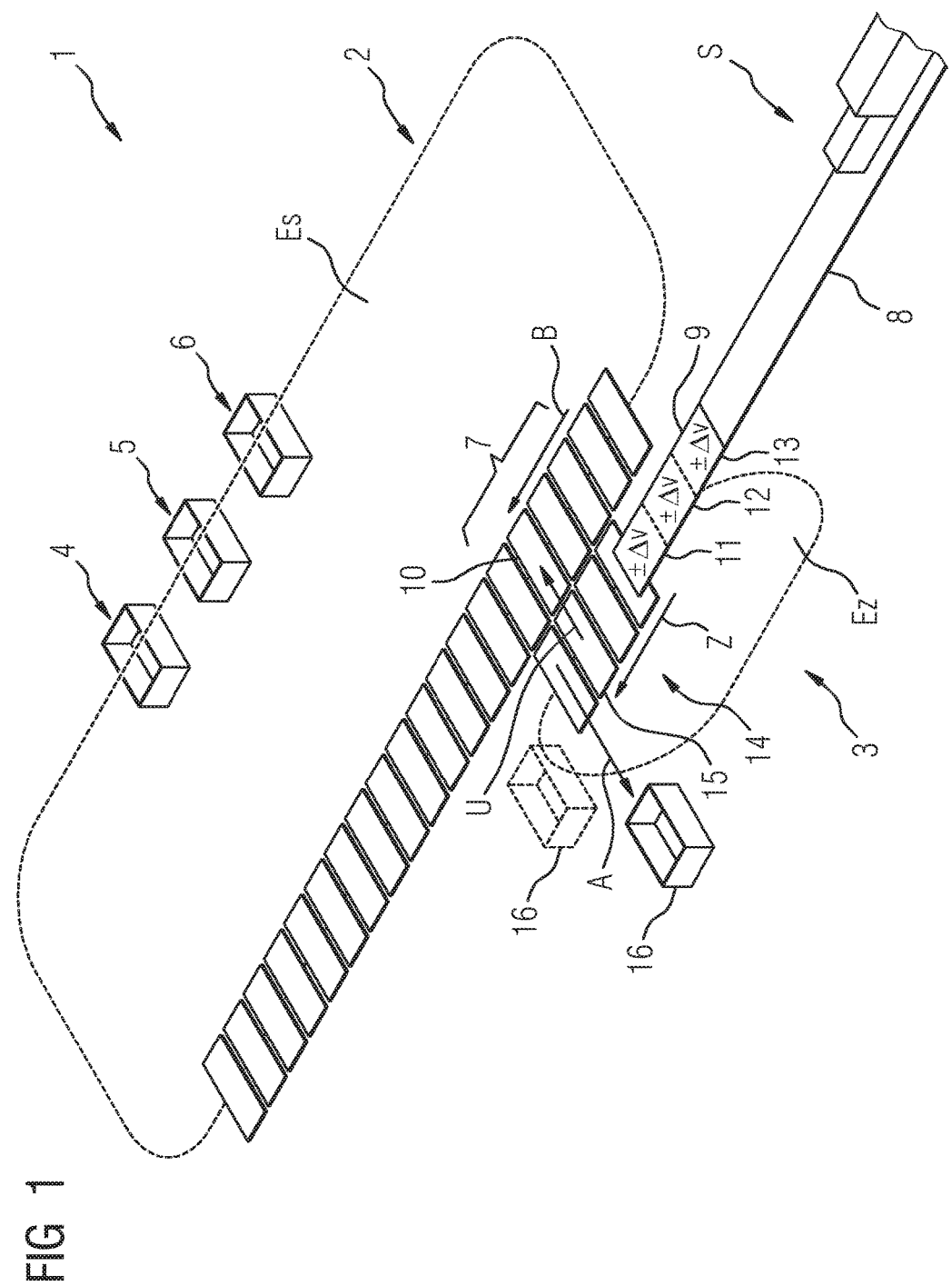
FIG. 1 shows an exemplary embodiment of an inventive control device.

The invention will now be described by way of example on the basis of embodiments relating to the drawings. The different features of the embodiments can be combined independently of one another, as shown in the individual advantageous embodiments.

The design and function of an inventive sorting device for sorting bulk material is firstly described with reference to the exemplary embodiment in FIG. 1.

FIG. 1 shows a schematic perspective view of the sorting device 1. The sorting device 1 has a sorting facility 2 and a feeding facility 3. The feeding facility 3 can be used to feed bulk material S to be sorted to the sorting facility 2. The sorting facility 2 assigns the bulk material S to sorting destinations 4, 5, 6 and transfers the bulk material S to the assigned sorting destination 4, 5, 6. The sorting destinations 4, 5, 6 may be containers which are provided independently of the sorting device 1. Overall three sorting destinations 4, 5, 6 are shown by way of example. The sorting device 1 may however also have more or fewer than the three sorting destinations 4, 5, 6 shown.

The feeding facility 3 runs at least in a transfer area 7, in which bulk material S is transferred from the feeding facility 3 to the sorting facility 2, in parallel with the sorting facility 2. In the transfer area 7 a direction of movement B of the sorting facility 2 runs in parallel with a feed direction Z of the feeding facility 3. In the feed direction Z the feeding facility 3 moves bulk material S to or in the transfer area 7. In the direction of movement B the sorting facility 2 transports the bulk material S received by the feeding facility 3 in and out of the transfer area 7.

The feeding facility 3 can have a transport facility 8, for instance a belt conveyor, for receiving the bulk material S to be sorted. The bulk material S can be placed on the transport facility 8 by an operator of the sorting device 1 or by an upstream device. The transport facility 8 transports the bulk material S in the direction of the transfer area 7.

An optimal acceleration facility 9 which may be downstream of the transport facility 8 can follow the transport facility 8 in the feed direction Z. The acceleration facility 9 can take over bulk material S to be sorted from the transport device 8. The acceleration facility 9 can be used to adjust the speed of the bulk material S to be sorted to the speed of movement of the sorting facility 2. In addition or alternatively the acceleration facility 9 can modify the speed of the bulk material S, in other words accelerate this in order to position the bulk material S at a predefined transport position 10, at which the bulk material S is to be transferred. The transport position 10 may be an individual goods carrier of the sorting facility 10, which receives the bulk material S and in which the bulk material S is moved to one of the sorting destinations 4, 5, 6. If just one bulk material S is to be positioned in each case, it is sufficient if the acceleration facility 9 has one and preferably no more than one acceleration segment.

Alternatively the acceleration facility can have a number of and for instance three acceleration segments 11, 12, 13 which can accelerate bulk material S independently of one another. The acceleration segments 11, 12, 13 are preferably arranged one behind the other in the feed direction Z in order to be able to accelerate the bulk material S in a space-saving manner. It may be necessary in particular to position the bulk material S in relation to the predefined transport position 10 if the bulk material S was not placed in a perfect position on the transport direction 8.

The sorting facility 2 of the exemplary embodiment in FIG. 1 has a transfer facility 14 in the transfer area 7. The transfer facility 14 is embodied to transfer bulk material S in a transfer direction U which runs at right angles to the feed direction Z to the sorting facility 2 and in particular to the predefined transport position 10. The transfer facility 14 can have a transfer segment 15, for instance a transverse belt conveyor, which moves the bulk material S in the transfer direction U. The transfer segment 15 preferably moves in the feed direction Z and in parallel with the direction of movement B of the sorting facility 2. In such cases the speed of the transfer segment 15 in the feed direction Z preferably amounts to the speed of the predefined transport position 10 in the transfer area 7.

In order to be able to transfer a number of bulk materials S or oversized bulk material S, which has a larger expansion in the feed direction Z than the transfer segment 15, the transfer facility 14 can have a number of transfer segments 15. The transfer segments 15 in the feed direction Z can be arranged one behind the other in the transfer area 7.

During operation of the sorting device 1, a bulk material S to be sorted in one of the sorting destinations 4, 5, 6 can be transferred from the transport facility 8 to the acceleration segment 13. The bulk material S can be accelerated with the acceleration segment 13 and thus prepositioned with respect to the predefined transport position 10. If the acceleration facility 9 has a further acceleration segment and for instance the acceleration segment 11, the speed of the bulk material S to be transferred can be adjusted by the acceleration segment 11 to the transport speed of the sorting facility 2 in the transfer area 7. The prepositioned bulk material S, the speed of which now corresponds to the speed of the sorting facility 2 and the transfer facility 14, is transferred by the acceleration segment 11 to the transfer facility 14 and in particular to the transfer segment 15.

The bulk material S can be transferred with a transfer speed in the transfer direction U to the sorting facility 2 and in particular to the predefined transport position 10 irrespective of the speed of the bulk material S in the direction of movement B or in the feed direction Z. The prepositioning of the bulk material S, the feed speed and the transfer speed can therefore be controlled substantially independently of one another, as a result of which all transport positions 10 can be occupied with bulk material S to be sorted and consequently the maximum possible throughput of the sorting facility 2 can be reached with just one feeding facility 3.

It may occur that bulk material S cannot be transferred to the sorting facility 2. For instance, no free transport position 10 may be available to receive the bulk material S.

Furthermore, it may be for instance that the bulk material S is too large or cannot be positioned sufficiently accurately. The sorting device 1 can have an unloading facility 16 for receiving non-transferable bulk material S. The unloading facility 16 can be positioned in the feed direction Z adjacent to the transfer facility 14. In particular the transfer facility 14 can be arranged between the unloading facility 16 and the sorting facility 14. For instance, the unloading facility 16 at right angles to the feed direction Z can overlap a projection of the transfer area 7 at right angles to the feed direction Z. Non-transferable bulk material S can consequently be easily transferred in an unloading direction A which runs counter to the transfer direction U from the transfer facility 14 to the unloading facility 16.

If the transfer facility 14 has the transfer segment 15 embodied as a transverse belt conveyor, this can thus move the non-transferable bulk material S easily counter to the transfer direction U and in the unloading direction A to the unloading facility 16. Alternatively, the unloading facility 16 can be arranged in the feed direction Z behind the feeding facility 3 and in particular behind the transfer facility 15, so that bulk material S not transferred to the sorting facility 2 can be brought into the unloading facility 16 in the feed direction Z.

If it is desirable that for various reasons non-transferable bulk material S is to be presorted for instance, the sorting device 1 can have a number of unloading facilities 16, which are arranged at right angles to the feed direction Z adjacent to the transfer area 7 and/or in the feed direction Z behind the transfer area 7.

The transfer segments 15 can also be referred to as provisioning carriers.

Both the transport positions 10 and also the transfer segments 15 can be embodied as transverse belt conveyors. Alternatively the transport positions 10 and/or the transfer segments 15 can be embodied to be tiltable in order to be able to transfer bulk material S in a tilted state due to gravity by means of slipping.

The sorting facility 2 and the feeding facility 3 are preferably embodied as a closed circuit in each case, wherein a plane Ez, in which the closed circuit of the transfer facility 14 is disposed, is preferably arranged at right angles to a plane Es, in which the transport positions 10 are moved, and for instance vertically. The vertical alignment of the plane Ez of the feed facility 3 further reduces the installation space required in the horizontal direction for the sorting device 1.

If two-dimensional goods to be sorted, for instance letters, are applied to the transport facility 8, this can at least firstly be moved vertically with the transport facility 8. In the further course the two-dimensional load can fall onto the transport facility 8 about an axis which runs in parallel with the feed direction Z in order to be able to easily transport this further and in particular without a guide.

FIG. 2 shows an inventive method for sorting bulk material S as a flow chart with reference to the exemplary embodiment in FIG. 2. For elements of the exemplary embodiment of the FIG. 1 which are helpful in terms of presenting the method, the same reference characters are used below.

FIG. 2 shows the method 20 for sorting bulk material S as a flow chart with a number of method steps. In the first method step 21, the method 20 is started. For instance the sorting device 1 is started in step 21. The first method step 21 is followed by a further method step 22, in which the feeding facility 3 and for instance its transport facility 8 are loaded with bulk material S.

In the optional method step 23, the bulk material S can be prepositioned and its speed can optionally be adjusted to the sorting facility 2, for instance with the acceleration facility 9.

In the next method step 24, the bulk material S is fed to the sorting facility 2 and in the process is moved at least in the transfer area 7 in parallel with the sorting facility 2 and in particular with its direction of movement B in the transfer area 7.

Method step 24 is followed by method step 25 in which the bulk material S is transferred at right angles to the direction of movement B to the sorting facility 2 and in particular to the predefined transport position 10. If the bulk material S is not to be transferable to the sorting facility 2, because, for instance, the predetermined transport position 10 is occupied or the bulk material S is too large, method step 24 can alternatively be followed by method step 26, in which the bulk material S is output at right angles to or in parallel with the direction of movement B, in particular from the feeding facility 3 to the unloading facility 16.

If the bulk material S was transferred to the sorting facility 2, method step 25 is followed by method step 27 in which bulk material S is sorted into the sorting destination 4, 5, 6.

The method ends with method step 28, for instance if there is no further bulk material S to be sorted.

The invention therefore relates to a sorting device and a method for sorting bulk material. In order to be able to load a sorting facility of the sorting device with just one feeding facility with bulk material such that the sorting facility can be operated with a high throughput, provision is made in accordance with the invention for the sorting facility and the feeding facility to be arranged so as to run in parallel with one another in a transfer area, in which bulk material is transferred from the feeding facility to the sorting facility.

The invention claimed is:

1. A sorting device for sorting piece goods, comprising:
   a sorter transporting piece goods to a plurality of sorting destinations during operation;
   a feeder disposed to feed piece goods to said sorting facility during the operation and to transfer the piece goods in a transfer area;
   said feeder having an accelerator for positioning the piece goods to be transferred;
   said accelerator having a plurality of acceleration segments configured to adjust a position of a plurality of piece goods relative to said sorter independently of one another;
   wherein said sorter and said feeding facility with said acceleration segments are configured so as to run in parallel with one another in said transfer area; and
   including an unloader for receiving piece goods which are not transferred from said feeder to said sorter, wherein said unloader is arranged adjacent to or behind said transfer area.

2. The sorting device according to claim 1, wherein said feeder has at least one transferer configured to move the piece goods transversely to a course of said feeder in said transfer area.

3. The sorting device according to claim 1, wherein said transferer is arranged downstream of said accelerator in a flow direction of the piece goods.

4. The sorting device according to claim 1, wherein said feeder is arranged at least in sections between said sorter and said unloader.

* * * * *